Patented Aug. 12, 1941

2,252,230

UNITED STATES PATENT OFFICE 2,252,230

ETHERS OF THYROXIN AND THEIR ESTERS AND A METHOD OF MAKING THE SAME

Arnold Loeser, Freiburg in Breisgau, Germany, assignor to Schering Corporation, Bloomfield, N. J., a corporation of New Jersey No Drawing. Application February 4, 1939, Serial No. 254,595. In Germany February 9, 1938

12 Claims. (Cl. 260—471)

This invention relates to the manufacture of ethers of thyroxin and their esters.

Of the definite chemical crystalline substances obtained hitherto from the thyroid gland and by corresponding synthesis, thyroxin has proved to be the most active. This compound has, however, the disadvantage that it is not as active perorally as the dried gland itself.

In accordance with the present invention, compounds of thyroxin highly active perorally are obtained when this is etherified on the hydroxyl group. The etherification can take place in the customary manner. However it is advisable to select etherifying agents which are not capable of alkylating the amino group. Particularly suitable for this purpose has proved etherification with diazo-methane. In this case it is suitable to work in a solvent in which the ether produced is soluble. Particularly suitable solvents are the ethers of the phenols, primarily anisole and phenetole.

As starting materials can be employed not only the free thyroxin but with advantage also its esters, which may be subsequently saponified to the thyroxin ether.

The ethers of thyroxin obtained according to the invention are intended to be employed as medicines. Primarily the methyl ether is distinguished by its high physiological activity, particularly also on peroral administration.

Thus its effect on the body weight, on the energy metabolism and on the carbohydrate metabolism of the liver is even stronger than the effect of thyroxin itself.

The following examples illustrate the invention:

Example 1

1 gram of thyroxin is suspended in 50 ccs. of anisole and the suspension treated at 0° C. with a solution of diazo-methane in 30 ccs. of anisole. The initially strong nitrogen evolution gradually subsides on storing the reaction mixture in an ice chest (0° C.) After 7 days' standing (ice chest) the liquid is filtered from insoluble material and the still yellow coloured filtrate is distilled below 60° C. for removal of the anisole. As residue there remains a yellow oily mass which after covering with benzine and allowing to stand for a short time in the ice chest becomes solid. After pouring off the benzine and heating the reaction product (methyl ester of the thyroxin-O-methyl-ether) with 8 ccs. of N/1 caustic soda solution and 8 ccs. of alcohol on the water bath at 80–90° C. there separates from the solution, after boiling with animal charcoal and filtering hot, and after the addition of glacial acetic acid, as a light brown coloured precipitate thyroxin-O-methyl ether.

Yield: 600 mg., M. P. 224° C.

Its formula is

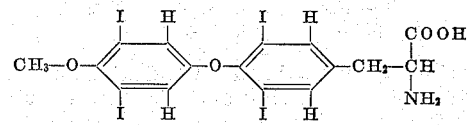

By dissolving the substance again in hot 70% weak alkaline alcohol and precipitation with glacial acetic acid colourless crystals are obtained which on long heating decompose between 226° and 228° C.

Example 2

1.15 grams of thyroxin-methyl-ester of M. P. 160° C. which has been obtained by the action of gaseous hydrochloric acid on a suspension of thyroxin in anhydrous methyl alcohol, are dissolved in 80 ccs. of anisole. The liquid is treated at 0° C. with a solution of diazo-methane in 30 ccs. of anisole. After 7 days' standing in an ice chest the yellow clear reaction mixture is distilled below 60° C. for removal of the anisole and the residue is treated as above with benzine (methyl ester of thyroxin-O-methyl-ether) and heated at 80–90° C. on the water bath for 15 minutes with 30 ccs. of 50% ethyl alcohol which contains 8 ccs. of N/1 caustic soda solution. After short boiling of the solution with animal charcoal and filtration there is deposited from the filtrate, after treatment of the latter with glacial acetic acid, a white precipitate which is filtered and dried over $P_2O_5$.

Yield: 800 mg., M. P. 226° C. After reprecipitation from boiling 70% weak alkaline alcohol the melting point is 228–229° C.

The pure thyroxin-methyl-ether forms microscopic colourless prisms which on long heating melt between 228 and 229° C.

It is free from thyroxin and gives no Komant reaction. If the ether is mixed with 2% thyroxin the mixture then shows a positive Komant reaction. The ether is practically insoluble in water and organic solvents. The sodium salt is less water-soluble than the sodium salt of thyroxin. The ether can best be purified by reprecipitation of the sodium salt from boiling 70% alcohol with acetic acid.

Having now particularly described and ascertained the nature of my said invention and in what manner the same is to be performed, I declare that what I claim is:

1. The manufacture of ethers of thyroxin and their carboxylic esters by subjecting a member of the group consisting of thyroxin and its esters to the action of an etherifying agent capable of reacting with the nuclearly bound hydroxyl group but not with the amino group in the molecule.

2. The manufacture of ethers of thyroxin and their carboxylic esters by subjecting a member of the group consisting of thyroxin and its esters to the action of diazo-methane.

3. Process as claimed in claim 2, in which the etherification is carried out in the presence of a solvent for the ether produced.

4. Process as claimed in claim 2, in which the etherification is carried out in the presence of a phenol ether as solvent.

5. Process as claimed in claim 1, in which an ether ester produced in the etherification is saponified to the ether acid.

6. Thyroxin-O-ether of the general formula $C_{15}H_9O_4NI_4RR'$ and the structural formula

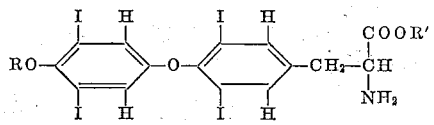

wherein R is an alkyl radical and R' is a member of the group consisting of hydrogen and alkyl-radicals.

7. A thyroxin-O-methyl-ether of the general formula $C_{16}H_{13}O_4NI_4$ and the structural formula

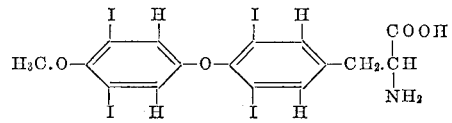

having a melting point of 228–229° C.

8. Carboxylic alkyl esters of a thyroxin-O-methyl-ether of the general formula $C_{16}H_{13}O_4NI_4$ and the structural formula

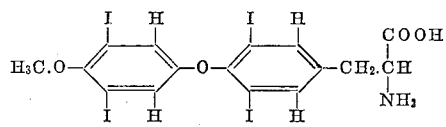

having a melting point of 228–229° C.

9. The manufacture of ethers of thyroxin and their carboxylic esters by subjecting a member of the group consisting of thyroxin and its esters to the action of an aliphatic diazo compound.

10. The manufacture of ethers of thyroxin and their carboxylic esters by subjecting a member of the group consisting of thyroxin and its esters to the action of a diazo-alkane.

11. Thyroxin ethers.

12. Ethers of thyroxin esters, the etherification being on the hydroxyl group and the esterification on the carboxylic group.

ARNOLD LOESER.